Patented Dec. 2, 1952

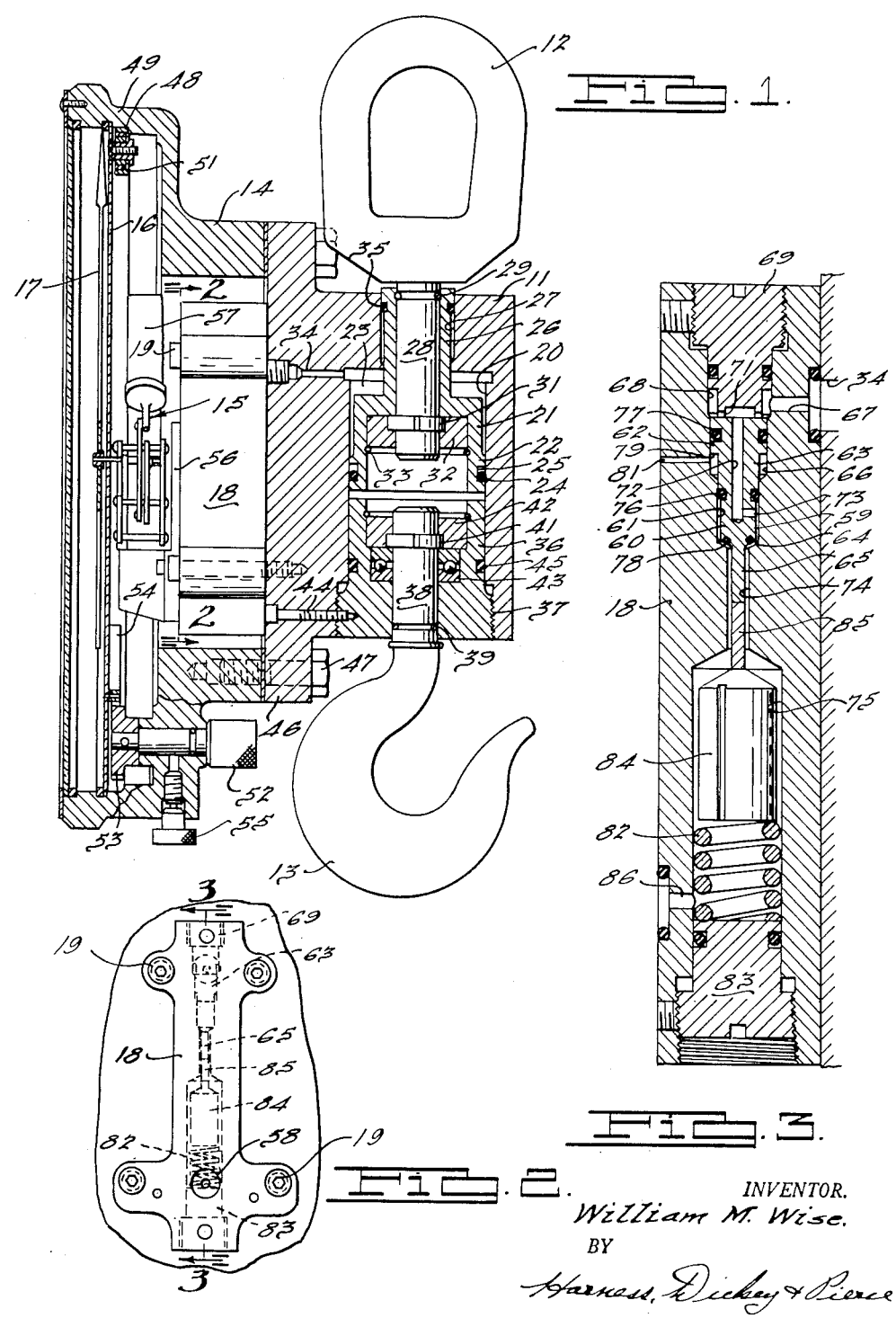

2,620,177

UNITED STATES PATENT OFFICE 2,620,177

HYDRAULIC WEIGHING SCALE WITH
OVERLOAD SAFETY MECHANISM

William M. Wise, Royal Oak, Mich.

Application October 10, 1951, Serial No. 250,627

5 Claims. (Cl. 265—47)

This invention relates to weighing scales and more particularly to safety devices for hydraulic scales such as are used with cranes and similar applications.

Hydraulic scales for automatically weighing a load as it is lifted are well known, these scales operated on the principle of a compressed fluid actuating a Bourdon tube which in turn moves an indicating element. Such a scale is shown, for example, in my application Serial No. 139,446 filed January 19, 1950. A primary difficulty with such scales has been the danger of overloading the gauge mechanism and thereby disengaging the gear segment and pinion in the indicator movement, thus damaging the scale sometimes beyond repair.

It is an object of the present invention to overcome this disadvantage of the present types of hydraulic scales and to insure against overloading of the gauge elements due to pressures beyond the maximum pressure range of the instrument.

It is another object to provide, in a scale of the above character, a novel and improved type of cut-off or overload valve in the hydraulic system of the scale, this valve serving to automatically cut off the pressure to the Bourdon element at a predetermined level, thus preventing disengagement of the gear segment and pinion.

It is a further object to provide a device of the above character, in which the valve means is of an extremely efficient and compact nature and can be combined with the conventional scale of this type with a minimum of additional expense.

Other objects, features, and advantages of the present invention will become apparent from the subsequent description, taken in conjunction with the accompanying drawings.

In the drawings:

Figure 1 is a side cross-sectional view of a hydraulic scale embodying the safety means of this invention, parts being shown out of their plane for clarity;

Figure 2 is a fragmentary detailed view taken substantially along the line 2—2 of Figure 1 and showing the valve housing; and Figure 3 is a cross-sectional view taken along the line 3—3 of Figure 2 and showing the valve construction.

The conventional parts of the hydraulic scale are shown in Figure 1 and comprise generally the casing or housing 11 which supports an upper eye or similar attaching means 12 and a lower hook 13, the eye 12 being adapted for connection to a crane or the like, and the hook 13 adapted to support a load. Secured to one side of casing 11 is a gauge housing 14 which holds a Bourdon gauge assembly generally indicated at 15, and a dial 16 and pointer 17 which are adapted to indicate the weight of the load. The hydraulic mechanism within casing 11 has fluid which is connected to the Bourdon gauge assembly, and the novel and improved safety means of this invention is enclosed within a valve housing 18 secured to one side of the casing by bolts 19, the valve being interposed between the hydraulic mechanism and gauge.

Referring more particularly to the hydraulic actuating mechanism within casing 11, more fully described in the aforesaid application, this mechanism comprises a substantially cylindrical chamber 20 vertically disposed within the carriage and substantially aligned with the eye 12 and hook 13. A piston 21 is disposed within cylinder 20 and in particular has a lower skirt portion 22 in engagement with the cylinder wall, the portion of the cylinder above this skirt portion defining a pressure chamber 23. A toroidal sealing member or so-called O-ring 24 is preferably disposed in an axially elongated peripheral groove 25 in piston skirt 22. The piston 21 has a bearing portion 26 extending upwardly therefrom through a bearing aperture 27 in casing 11, and the eye 12 has a lower securing portion 28 which extends axially through piston extension 26, a dust seal 29 being preferably provided between these members. The lower end of extension 28 is secured to the piston by means of a split shear ring 31 and a collar 32 held by a snap ring 33. An upward axial force on the eye 12 will thus cause slight upward movement of piston 21 against the fluid within chamber 23, forcing this fluid outwardly through lateral port 34 to valve housing 18. To prevent leakage of fluid, a pressure seal 35 may be provided between the reduced portion 26 of the piston and the casing.

The cylinder space 20 in casing 11 extends downwardly below the piston 21, and a block 36 seals the lower part of the casing being threadably secured therein at 37. Hook 13 has an upwardly extending swivel portion 38 within block 36, preferably provided with a dust seal 39. A split shear ring 41 and collar 42 hold extension 38 within the block, and a thrust bearing 43 which may be of an anti-friction type is disposed below collar 42 so that the hook 13 is freely rotatable. It will be observed that eye 12 is likewise held for free rotation by piston extension 26. The block 36 is secured in place by a set screw 44, and a dust seal 45 may also be provided for this block.

The gauge housing 14, which is secured to a flange 46 of casing 11 by bolts 47, supports the dial 16 by means of an annular track 48 within the dial supporting flange 49, this track being preferably adapted to accommodate a plurality of anti-friction bearing assemblies 51 secured to the rear face of the dial. The dial is thus adapted to be rotated by a knurled knob 52 and pinion 53 to adjust for the tare, pinion 53 engaging a segmental rack 54 on the rear of the dial. A tare lock screw 55, shown in Figure 1 as rotated out of its actual plane normal to the paper, may be provided also for locking knob 52 in place. The Bourdon gauge assembly 15, which may be of any conventional type, is mounted on the forward face of valve housing 18 by means of a bracket 56, the Bourdon tube 57 being connected at a point not visible in the drawing to the pressure fluid leaving the lower portion of valve housing 18 through a port 58 as seen in Figure 2.

The valve within housing 18 is seen best in Figure 3 and comprises a valve member 59 having a reduced portion 60 which is concentrically disposed within an axial passageway 61 in housing 18. Valve member 59 preferably comprises an upper piston portion 62 and a neck portion 63 therebelow, the lower end of this neck portion being reduced portion 60 and ending in a tapered valve surface 64. An extension 65 of still further reduced diameter depends from valve surface 64. The piston portion 62 of valve member 59 is disposed at the upper part of an enlarged chamber 66 which is connected to the upper part of passageway 61. The upper surface of piston portion 62 is subjected to pressure from pressure conduit 34 by means of a port 67 which leads into a chamber 68 above the piston. A plug 69 having a serrated lower end 71 engageable by the piston face insures continuous pressure flow from conduit 34 to the piston face.

An axial passageway 72 leads downwardly from the piston face through valve member 59, and this passageway has a lateral portion 73 leading to space 61. It will be seen that with the valve in the position shown in Figure 3 fluid under pressure is allowed to flow from conduit 34 through 72 and 73 to passageway 61, and from there through an axial passageway 74 surrounding extension 65 to a lower chamber 75. It will be observed that a pressure seal 76 is provided between the reduced portion 60 of the valve member and the neck portion 63 so that no fluid is allowed to be forced into chamber 66. Additional sealing members 77 and 78 may be provided in the piston portion and the valve surfaces respectively of the valve member. The back area 79 of the piston portion 62 thus represents a differential pressure area, and for this purpose the chamber 66 is vented by means of a vent port 81 to the atmosphere.

The differential pressure on valve member 59 is opposed by a compression coil spring 82 which is disposed at the lower end of chamber 75, this chamber being closed by means of a plug 83 which is threadably adjustable to vary the spring compression. The means for transmitting the force of spring 82 to valve member 59 comprises an intermediate block 84 having a wide lower portion engageable by the spring 82 and a reduced upper portion 85 disposed within passageway 74. The upper end of extension 85 engages the lower end of valve extension 65 so that the spring 82 normally holds the valve in the position shown in Figure 3, with the upper end of the valve abutting the serrated lower end 71 of block 69. It will be observed that the diameter of block 84 is substantially less than the internal diameter of chamber 75 so that the fluid may pass freely through to an outlet port 86 which leads to the Bourdon gauge.

In operation, the valve will normally be held in its open position as shown in Figure 3 with the valve surface 64 lifted away from the valve opening. Upon an increase in pressure within chamber 23 of the hydraulic mechanism, fluid under pressure will be transmitted through conduit 34 through passageways 72 and 73, annular space 61, passageway 74 and chamber 75 to the outlet port 86. The force of spring 82 as set by adjusting member 83 is such that upon the application of a predetermined pressure to valve piston 62, which is less than the maximum permissible pressure in the Bourdon gauge assembly, the differential pressure on valve 59 will overcome the resistance of spring 82, forcing the valve downwardly against its seat. This will immediately prevent any further increase in pressure from reaching the outlet port 86 and thus affecting the Bourdon gauge. It will be observed that any increase in pressure will tend to further seal the valve against opening so that once the valve has been moved to its closed position there is no possibility of further increase in pressure causing leakage or failure of the parts. Upon a decrease in pressure below the pre-set amount the force of spring 82 will again overcome the pressure differential on valve 59 causing the valve to reopen.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In combination with a hydraulic weighing scale of the type having a pressure chamber and a pressure actuated gauge, safety means for said scale comprising an overload valve interposed between said pressure chamber and said gauge, said valve comprising a piston valve member movable between an open position allowing communication between the chamber and gauge and a closed position shutting off such communication, a differential pressure area on said piston urging the valve toward its closed position, and resilient means normally holding said valve in its open position against the force of said differential pressure area.

2. A weighing scale comprising a piston and cylinder adapted to be connected between a load and a support, an indicator movable by fluid pressure, a fluid medium interconnecting said cylinder and said indicator, and overload means for preventing the operation of said indicator by said fluid medium above a predetermined pressure, said overload means comprising a valve interposed between said cylinder and said indicator, said valve being movable between an open and a closed position, resilient means normally holding said valve in its open position, and a pressure differential element operable by said fluid medium when raised above a predetermined pressure from moving said valve from its closed position against the action of said resilient means.

3. In a weighing scale, a casing having a cylinder therein, upper and lower connecting means supported by said casing and adapted to be connected between a load and a support, a piston within said cylinder and movable by a tension force between said upper and lower connecting means, a gauge housing secured to said casing, a gauge within said housing and adapted to be operated by fluid pressure, a fluid medium interconnecting said cylinder and gauge, and an overload valve interposed between said cylinder and said gauge, said overload valve being movable from its open to its closed position by a predetermined increase in the pressure of said fluid medium.

4. In combination with a hydraulic weighing scale of the type having a fluid medium subjected to pressure within a cylinder and a gauge operated by said fluid medium, an overload valve interposed between said cylinder and said gauge, said valve comprising a valve housing having a connection to said cylinder and a connection to said gauge, a passageway between said connections, a valve seat in said passageway, a valve member axially movable in said passageway between an open and a closed position, said valve member having a surface subjected to pressure from said cylinder connection and a differential pressure area connected to the atmosphere, and resilient means normally holding said valve in its open position whereby pressure may be transmitted between said connections, a predetermined rise in pressure causing said valve to move to its closed position against the action of said resilient means.

5. The combination according to claim 4, said valve member being further provided with an axial extension, and an intermediate motion-transmitting block disposed between said resilient means and said extension.

WILLIAM M. WISE.

No references cited.